United States Patent [19]

Kruppa

[11] Patent Number: 4,973,225
[45] Date of Patent: Nov. 27, 1990

[54] ADJUSTABLE PROPELLER

[76] Inventor: Claus Kruppa, Lückhoffstr. 35, 1000 Berlin 38, Fed. Rep. of Germany

[21] Appl. No.: 405,682

[22] Filed: Sep. 8, 1989

[30] Foreign Application Priority Data

Sep. 28, 1988 [EP] European Pat. Off. ........ 88115932.1

[51] Int. Cl.$^5$ .............................................. B63H 3/08
[52] U.S. Cl. ................................ 416/157 R; 416/93 A
[58] Field of Search ............ 416/93 A, 93 M, 61, 416/49, 167, 157 R, 169 C, 134 R

[56] References Cited

U.S. PATENT DOCUMENTS

| | | | |
|---|---|---|---|
| 2,353,773 | 7/1944 | Unterberg | 416/157 R |
| 2,355,039 | 8/1944 | Eves | 416/157 R |
| 3,051,249 | 8/1962 | Dirlik | 416/157 R |
| 3,056,457 | 10/1962 | MacFarland | 416/157 R |
| 3,232,350 | 2/1966 | Lorenz | 446/167 X |
| 3,338,313 | 8/1967 | Tolley et al. | 416/169 C X |
| 3,412,808 | 11/1968 | Parr | 416/158 |
| 3,600,102 | 8/1971 | Dirlik | 416/157 R |
| 3,895,883 | 7/1975 | Pedersen | 416/61 |
| 4,599,043 | 7/1986 | Müller | 416/167 X |
| 4,744,727 | 5/1988 | Muller | 416/93 A |

FOREIGN PATENT DOCUMENTS

| | | | |
|---|---|---|---|
| 168030 | 12/1954 | Australia | 416/157 R |
| 789794 | 11/1935 | France | 416/157 R |
| 588795 | 6/1947 | United Kingdom | 416/419 |
| 643014 | 9/1950 | United Kingdom | 416/157 |

OTHER PUBLICATIONS

EP0281022 9-1988 Europe Muller 416-93 A.
WO86/01173 2-1986 416-93 A.

Primary Examiner—John T. Kwon
Attorney, Agent, or Firm—Helfgott and Karas

[57] ABSTRACT

A controllable pitch propeller, particularly for a boat drive, has a driven rotating hub and adjustable propeller blades positioned thereon. An adjustment device is provided, having an adjustment ring that can move axially and which has adjustment bars attached to it for adjustment of the propeller blades. At least one continuous waste gas channel is positioned in the hub. In order to relieve the hub of external adjustment forces, the adjustment ring is constructed as a cylinder piston which is movably axially positioned in a cylinder chamber of the hub, and which can be acted upon hydraulically on both sides.

9 Claims, 3 Drawing Sheets

ADJUSTABLE PROPELLER

BACKGROUND OF THE INVENTION

The present invention relates to a controllable pitch propeller, particularly for boat drive, which includes a rotating driven hub and propeller blades positioned thereon in adjustable manner, and an adjustment device having an adjustment ring that can move axially and to which adjustment bars for the propeller blades are attached. At least one continuous exhaust gas channel is positioned in the hub.

Controllable pitch propellers of this type are known (EP-A-02 31 503, US-A-47 44 727). They are used on outboard engines with Z-type propellers, and also with direct bedding in the hull. Their size is such that they can replace a customary propeller with fixed propeller blades. Since Z-type propellers require large hub diameters, the exhaust gases of the drive engine are led through the interior of the hub, which is constructed as a waste-gas channel.

In controllable pitch propellers of the generic type initially described, forces for adjusting the propeller blades are applied from outside to the lever bars positioned on the adjustment ring. Thus the adjustment forces are external forces that are transmitted together with the propeller thrust forces generated by the propeller blades to a hub bearing. Since in an adjustment device of this type the adjustment forces are almost as great as the thrust forces, not only the force-conveying parts of the hub but also the hub bearing must be of an appropriate size. This can lead to considerable problems, particularly in small embodiments.

For controllable pitch propellers for ocean-going vessels, it is known that an hydraulic fluid is introduced into the propeller hub to activate a piston system positioned in the hub, which piston system adjusts the propeller blades (US-A-29 31 443).

SUMMARY OF THE INVENTION

It is an object of the present invention to relieve the hub, in an adjustable propeller of the generic type initially described, of external adjustment forces.

This and other objects are attained by constructing the adjustment ring of the pitch propeller as a cylindrical piston positioned in a cylinder chamber formed in the hub in such manner that the piston can be hydraulically activated axially on either side. This ensures a space-saving construction, particularly when the adjustment bars extend into the cylinder chamber and are guided into a section of the hub which adjoins the cylinder chamber, in such manner that they are sealed off and are free of play. All adjustment forces act only within the cylinder chamber. Thus, they are internal forces that no longer act on the hub bearing. Sufficient space remains inside the hub for the positioning and attaching of a drive shaft and also for one or more waste gas channels.

In an embodiment, holes are appropriately provided in the hub for the feeding of hydraulic fluid to two working chambers of the cylindrical piston. These holes can open particularly at the front end of one working chamber, into a tube extending from the holes for the purpose of supplying the other working chamber. The tube is guided in a sealed manner into a corresponding passage of the cylindrical piston and extends into the other working chamber. It is understood that holes for the feeding of hydraulic fluid are positioned in the hub areas with sufficiently thick walls and can therefore have varying bore cross-sections with various orientations.

A preferred embodiment of the invention is characterized by the presence of an axial sleeve on the rotating hub, which sleeve extends into a non-rotating stator which has in its interior two circular grooves which together with the sleeve form toroidal chambers. The hydraulic fluid feed lines which are led through the stator feed open into the toroidal chambers. The holes leading to the working chambers of the cylindrical piston run out from the toroidal chambers on the sleeve side. Pumps and control devices for the feeding of the hydraulic fluid can then be positioned on the stator or on a part connected with it.

To lessen or completely prevent losses of hydraulic fluid, it is recommended that cylindrical discharge chambers be provided on either side of the toroidal chambers, positioned adjacent to one another. The discharge chambers are connected to a discharge line of the stator. It may also be appropriate to position the stator itself flexibly on a carrier, a boat hull, or similar object, so that the stator can, without compulsion, follow movements of the sleeve connected with the rotating shaft without major transfer of forces between these two parts.

With the arrangement described, it is also possible to measure each position of the propeller blades and to use the measurement signals for control or adjustment purposes, if in accordance with the invention the adjustment bars extend into the discharge chambers on the blade side and there activate a tappet or plunger positioned on the stator. The plunger can be moved against the action of a spring and activate a potentiometer. In particular, the ends of the adjustment bars can be fastened to a slide ring positioned in the discharge chamber on the propeller side. The slide ring is constructed as a rotating retainer bearing for a further ring which is rigidly connected to the stator and which can move axially with the plunger.

One embodiment of the invention, illustrated in the drawing, is explained below.

DETAILED DESCRIPTION OF THE PREFERRED EMBODIMENT

Figure 1:
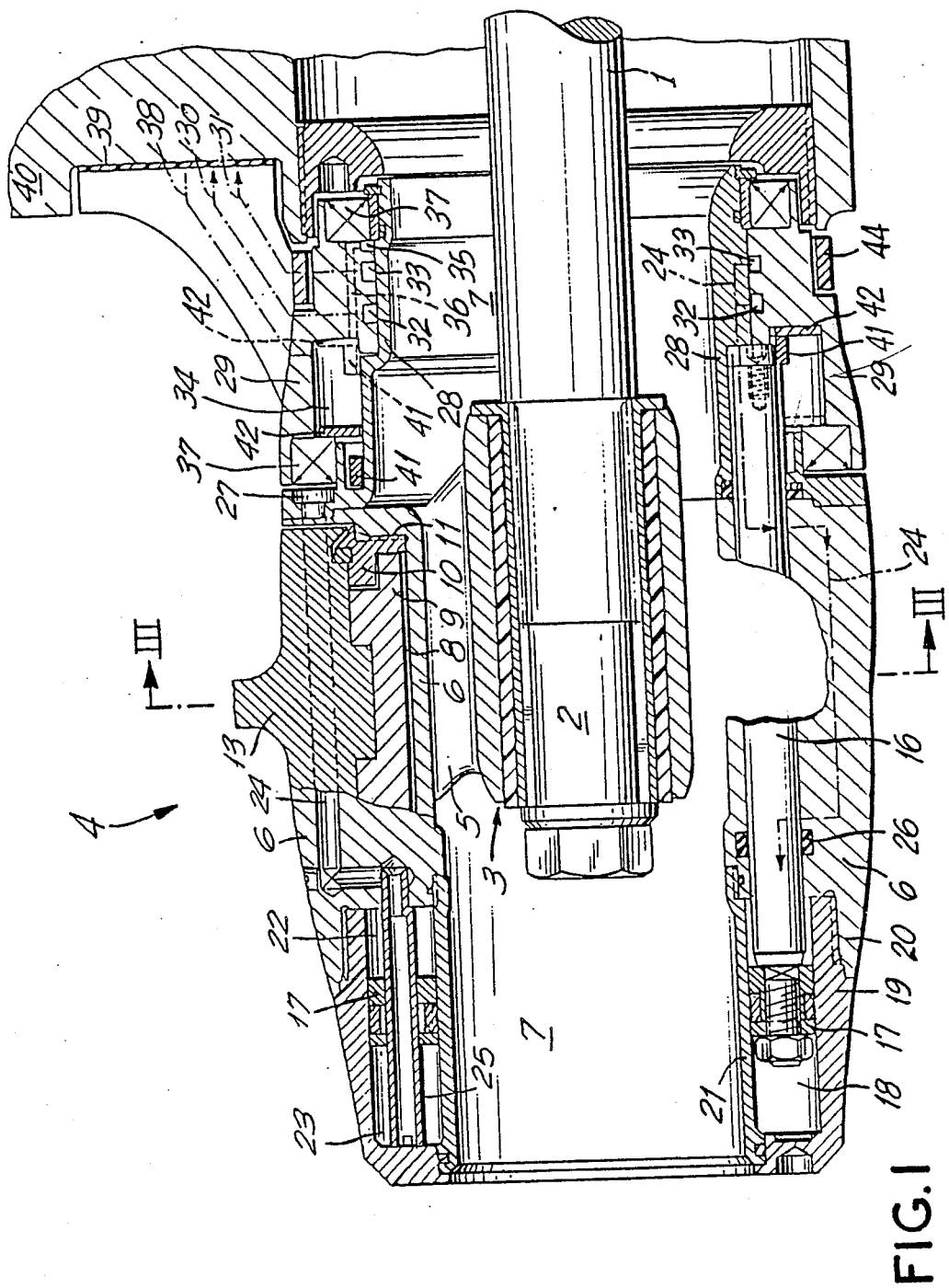
FIG. 1 is a schematically and partially illustrated section through a controllable pitch propeller, the top and bottom portions of the figure reproducing sections in various planes.

The controllable pitch propeller illustrated in the drawing is designed for boat drives with an outboard engine, a Z-type propeller, or similar device. The controllable pitch propeller is driven by a shaft 1, the drive end of which is connected with a bevel gear (not illustrated). The other end 2 of shaft 1 is positioned in a bearing sleeve 3 of a hub 4 which rotates with shaft 1. Bearing sleeve 3 is connected via radial connectors or webs 5 with an external hub housing 6. There are continuous exhaust gas channels 7 provided between the radial webs 5.

In the embodiment illustrated, the external hub housing 6 has on its outside wall three recesses 8 positioned at the same angle with respect to each other and having a circular configuration. An adjustment plate 9 is inserted into each recess 8, and is held in the recess 8 by means of a retaining or holding ring 10 in such manner that it can turn; namely retaining ring 10 is turnably positioned in a thread 11 of the respective recess 8. A propeller blade 13 is fastened to each adjustment plate 9 by screws 12. Each adjustment plate 9 has a radial groove 14 for receiving a slide element 15 inserted therein. The slide elements 15 are rotationally positioned on adjustment bars 16 which are axially guided in the external hub housing 6. The propeller blades 13 are adjusted by axial sliding of the adjustment bars 16.

The adjustment device of the adjustment bars 16 includes a ring-shaped piston 17 fastened to the left (in FIG. 1) ends of the adjustment bars 16, and a cylinder chamber 18 extending in the axial direction of hub 4. The piston 17 is positioned in cylindrical chamber 18 in such manner that it can be acted upon from both sides thereof. The cylinder chamber 18 is located in a hub attachment or part 19, which is screwed into a respective threaded recess 20 at the end of the external hub housing 6, and it is formed between the exterior wall of this hub attachment or part 19 and a sleeve 21 braced by hub part 19 against hub housing 6.

Working chambers 22, 23 of the cylinder chamber 18 are supplied with hydraulic fluid via holes 24 provided in the external hub housing 6 and extending from chambers 32, 33 connected to feed lines 30, 31 to the chambers 22, 23 as shown in FIG. 1. The holes 24 open into the blade-side front end of cylinder chamber 18. Blade-side working chamber 22 can thus be supplied with hydraulic fluid directly. To supply the other working chamber 23, a tube 25 is inserted into a respective hole or bore 24. Tube 25 extends in sealed manner through the piston 17, and opens into the other working chamber 23. This is reproduced in the top section of hub part 19 in FIG. 1.

At least in the external hub housing 6 section that is connected with cylinder chamber 18, the adjustment bars 16 have no play, and in addition they have sealings 26.

The hydraulic fluid feed holes 24 consist of several hole sections cut through the external hub housing 6 in various directions, indicated in FIG. 1 by dash-dot lines. Holes 24 are further cut through a sleeve 28, flanged to the hub housing 6 with a screw connection 27. The sleeve 28 extends as far as a non-rotating stator 29. Hydraulic fluid feed lines 30, 31 are led through stator 29. The lines 30, 31 open into circular or annular grooves of the stator 29, which grooves together with the sleeve 28 form the aforementioned toroidal chambers 32, 33. The holes 24 run out from toroidal chambers 32, 33, on the sleeve side. On both sides of toroidal chambers 32, 33, which are adjacent to each other, there are annular discharge chambers 34, 35, in the stator 29. The discharge chambers 34, 35 are connected one below the other via a line 36. On the outside, each of the discharge chambers 34, 35 is sealed by a gasket 37, positioned in the stator 29 and sliding on sleeve segments. A discharge line 38 guided through stator 29 opens into the left (FIG. 1) discharge chamber 34. Discharge chambers 34, 35 are under lower hydraulic pressure than toroidal chambers 32, 33. They prevent the hydraulic fluid exiting from the toroidal chambers 32, 33 from flowing into the water. They also reduce pressure losses thereby arising in toroidal chambers 32, 33 or in the working chambers of piston 17.

When the controllable pitch propeller is in operation, the sealing and the transmission of the hydraulic fluid between the stator 29 and the sleeve 28 rotating with hub 4 and which together with hub 4 is carried by shaft 1, will be affected as little as possible by forces from relative movements between rotating and non-rotating parts, the stator 29 being flexibly connected at 39 to a carrier 40 (e.g. an outboard engine).

Figure 2:
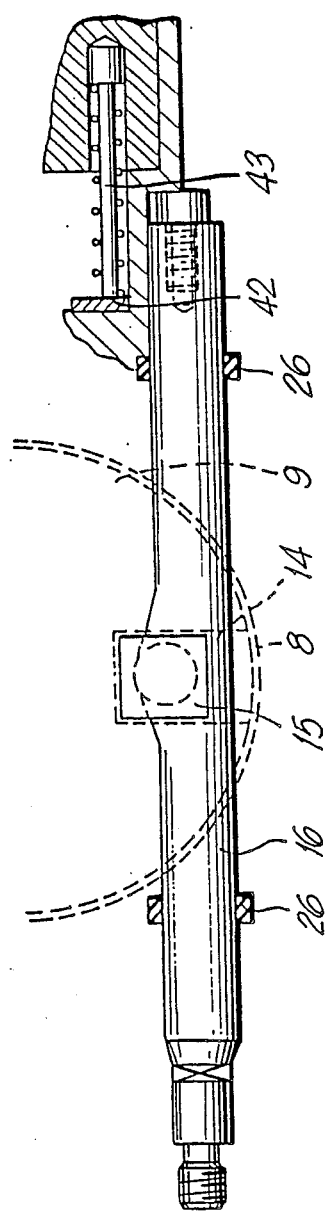
FIG. 2 is a top view of an adjustment bar.
Figure 3:
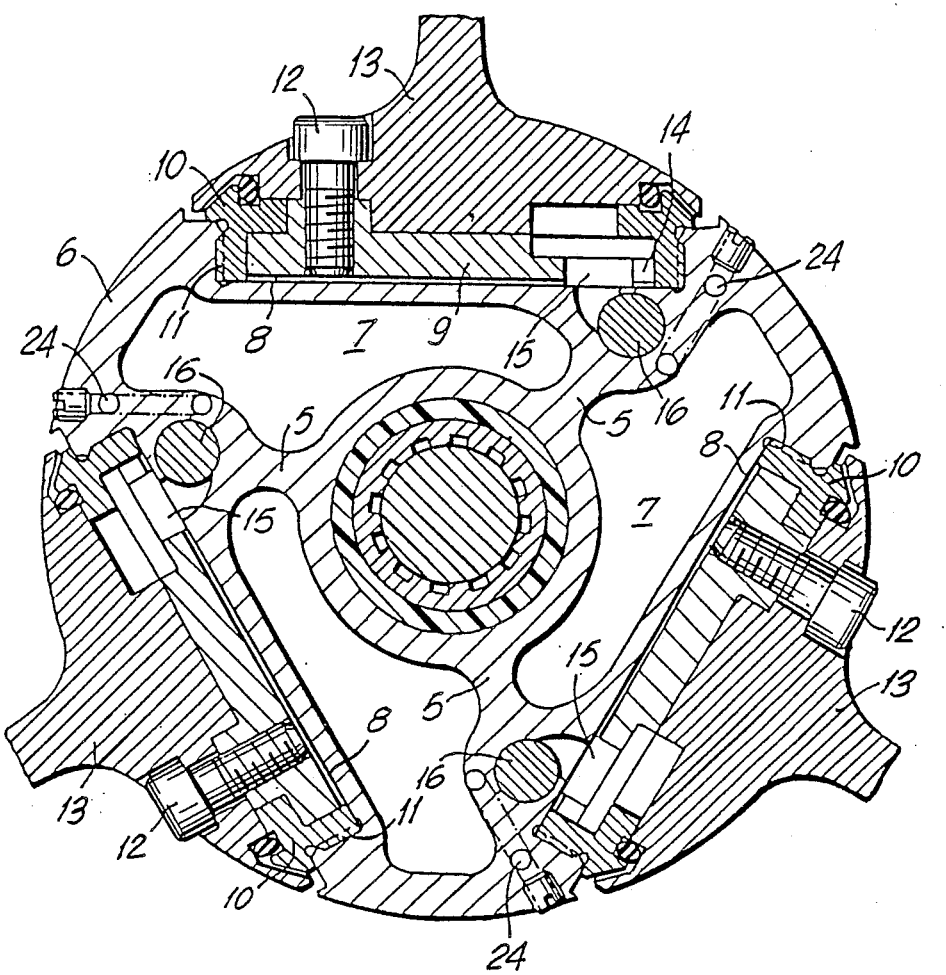
FIG. 3 is a section along line III—III of FIG. 1.

As evident from FIG. 1, the annular discharge chamber 34 is larger than the other discharge chamber 35. The ends of adjustment bars 16 extend into the discharge chamber 34, with each of the adjustment bar ends having a bearing for a slide ring 41 rotating with hub 4. Slide ring 41 can slide axially in the discharge chamber 34, and its end face opposite to that facing the end of the respective bar 16 rests on a ring 42 rigidly fixed in the stator 29. The ring 42 in turn is supported in such manner that it can slide axially, on at least one spring-biased tappet or plunger 43 as seen in FIG. 2. The plunger 43 activates a potentiometer 44. When adjustment bars 16 are moved the slide ring 41 is moved therealong, and displaces ring 42 with plunger 43, whereupon potentiometer 44 is thereby adjusted. A measurement signal taken from potentiometer 44 can be used for control or adjustment purposes. The final positions of slide ring 41 and the ring 42 carried by it are reproduced in FIG. 1, top, with straight lines on one side and broken lines on the other.

Stator 29 with sealings and transmission for the hydraulic fluid can also be arranged even further from the actual propeller hub, for example, in the area of a gear box for shaft 1. This arrangement is not illustrated.

While particular embodiments of the present invention have been shown as described, it will be obvious to those skilled in the art that changes and modifications may be made without departing from the invention in its broader aspects. Therefore, the aim in the appended claims is to cover all changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A controllable pitch propeller, particularly for a boat drive, comprising a drive shaft, a rotating hub driven by said shaft, said hub including an external housing having propeller blades mounted thereon and an inner bearing sleeve receiving said shaft and connected to said external housing by radial webs so that exhaust gas channels are formed between said external housing and said inner bearing sleeve; and adjustment means provided in said hub for said propeller blades, said adjustment means including a plurality of adjusting bars guided in said outer housing and an adjustment ring connected to said bars, said adjustment ring being formed as a single ring-shaped piston, said external housing having a cylindrical chamber in which said piston is reciprocally movable in an axial direction thereof, said cylindrical chamber having two working chambers at two sides of said piston, said external housing further having bores for supplying hydraulic fluid to said working chambers, one of said bores opening into an end of one of said working chambers, and a tube being provided to connect one of said bores to another of said working chambers to supply said another chamber with hydraulic fluid, said tube being guided in a sealed manner through a corresponding passage of said cylinder piston.

2. Controllable pitch propeller according to claim 1, wherein said two working chambers are arranged in said external housing concentrically with said drive shaft.

3. Controllable pitch propeller according to claim 1, wherein said adjustment bars extend as far as said cylindrical chamber and are guided, in a sealed manner and without any play, in a portion of said hub which is connected with said cylindrical chamber.

4. Controllable pitch propeller according to claim 1, wherein said hub is provided with hydraulic fluid feed lines leading to said bores for feeding hydraulic fluid into said working chambers of said piston.

5. Controllable pitch propeller according to claim 4, further comprising a stationary stator, and wherein said hub has an axial sleeve which extends in said stationary stator, said stator having two circular grooves which together with said axial sleeve form toroidal chambers in said stator; said hydraulic fluid feed lines leading through said stator and opening into said toroidal chambers, and said bores leading to said working chambers running out from said toroidal chambers on a sleeve side.

6. Controllable pitch propeller according to claim 5, wherein annular discharge chambers are formed on both sides of said toroidal chambers positioned adjacent to each other, said discharge chambers being connected to a discharge line provided in said stator.

7. Controllable pitch propeller according to claim 6, wherein said stator is flexibly positioned on one of a carrier and a boat hull.

8. Controllable pitch propeller according to claim 6, wherein said adjustment bars extend up to that discharge chamber which is a blade-side discharge chamber; and further comprising a plunger positioned at the stator and which can be moved against the action of a spring, said adjustment bars acting on said plunger; and further including a potentiometer actuated by said plunger.

9. Controllable pitch propeller according to claim 8, wherein said adjustment bars have bearings at ends thereof; and further comprising a slide ring positioned on the blade-side discharge chamber and received in said bearings, said slide ring being constructed as a rotating retainer ring for a further ring rigidly connected to said stator and movable axially with said plunger.

* * * * *